(12) United States Patent
Harren et al.

(10) Patent No.: US 9,026,525 B2
(45) Date of Patent: May 5, 2015

(54) GENERIC NODE INCLUDING STORED SCRIPT

(75) Inventors: Arne Harren, Heidelberg (DE); Tobias Elfner, Schriesheim (DE); Gerd Forstmann, Nussloch (DE); Maciej Kabala, Reilingen (DE); Carsten Binnig, Neckarburken (DE); Stefan Kain, Rauenberg (DE); Franz Faerber, Walldorf (DE); Till Westmann, Schriesheim (DE)

(73) Assignee: SAP SE, Walldorf (DE)

( * ) Notice: Subject to any disclaimer, the term of this patent is extended or adjusted under 35 U.S.C. 154(b) by 349 days.

(21) Appl. No.: 12/979,182

(22) Filed: Dec. 27, 2010

(65) Prior Publication Data
US 2012/0166422 A1    Jun. 28, 2012

(51) Int. Cl.
*G06F 17/30* (2006.01)
(52) U.S. Cl.
CPC ................... *G06F 17/30463* (2013.01)
(58) Field of Classification Search
CPC ............... G06F 17/30463; G06F 17/30433; G06F 17/30474; G06F 17/30935; G06F 17/30938
USPC ............................................ 707/718; 717/106
See application file for complete search history.

(56) References Cited

U.S. PATENT DOCUMENTS

| | | | | |
|---|---|---|---|---|
| 5,875,334 | A  * | 2/1999  | Chow et al. | 717/141 |
| 6,356,887 | B1 * | 3/2002  | Berenson et al. | 1/1 |
| 6,477,540 | B1 * | 11/2002 | Singh et al. | 1/1 |
| 2005/0028134 | A1 * | 2/2005 | Zane et al. | 717/106 |
| 2008/0104095 | A1 * | 5/2008 | Heifets et al. | 707/101 |
| 2010/0162246 | A1 * | 6/2010 | Tollefson et al. | 718/101 |
| 2012/0089595 | A1 * | 4/2012 | Jaecksch | 707/714 |
| 2012/0117041 | A1 * | 5/2012 | Rodriguez et al. | 707/702 |

* cited by examiner

*Primary Examiner* — Rehana Perveen
*Assistant Examiner* — Alexander Khong
(74) *Attorney, Agent, or Firm* — Mintz Levin Cohn Ferris Glovsky and Popeo, P.C.

(57) ABSTRACT

Methods and apparatus, including computer program products, are provided for providing for processing calculation plans. In one aspect, there is provided a computer-implemented method. The method may include generating a calculation plan including a plurality of nodes; determining whether at least one of the nodes includes a function node; and compiling the function node into executable code to enable execution of the plurality of nodes including the function node at the database. Related apparatus, systems, methods, and articles are also described.

18 Claims, 6 Drawing Sheets

GENERIC NODE INCLUDING STORED SCRIPT

FIELD

The present disclosure generally relates to data processing.

BACKGROUND

A database is an electronic filing system that stores data in a structured way. The primary storage structure in a database is a table, although unstructured mechanisms may be used as well. A database may contain multiple tables and each table may hold information of a specific type. Database tables store and organize data in horizontal rows and vertical columns. For example, in a row store database, rows typically correspond to real-world entities or relationships that represent individual records in a table. Columns may denote specific attributes of those entities or relationships, such as "name," "address" or "phone number." In this example, Company X may have a database containing a "customer" table listing the names, addresses, and phone numbers of its customers. Each row may represent a single customer, and the columns may represent each customer's name, address, and phone number.

A database may receive at least one command implementing operations, such as a query, a join, and the like, on the data in the database. Moreover, the database management system of the database may have a plurality of ways of retrieving the result set for the received command(s). The database management system may thus determine a query plan to determine how to perform the operations required to obtain the result set from the database. Thus, the query plan, which is also referred to as a calculation plan, defines how the operations are performed at the database to obtain the result set.

SUMMARY

The subject matter disclosed herein provides methods and apparatus, including computer program products, for generating calculation plans for databases.

In one aspect, there is provided a computer-implemented method. The method may include generating a calculation plan including a plurality of nodes; determining whether at least one of the nodes includes a function node; and compiling the function node into executable code to enable execution of the plurality of nodes including the function node at the database.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
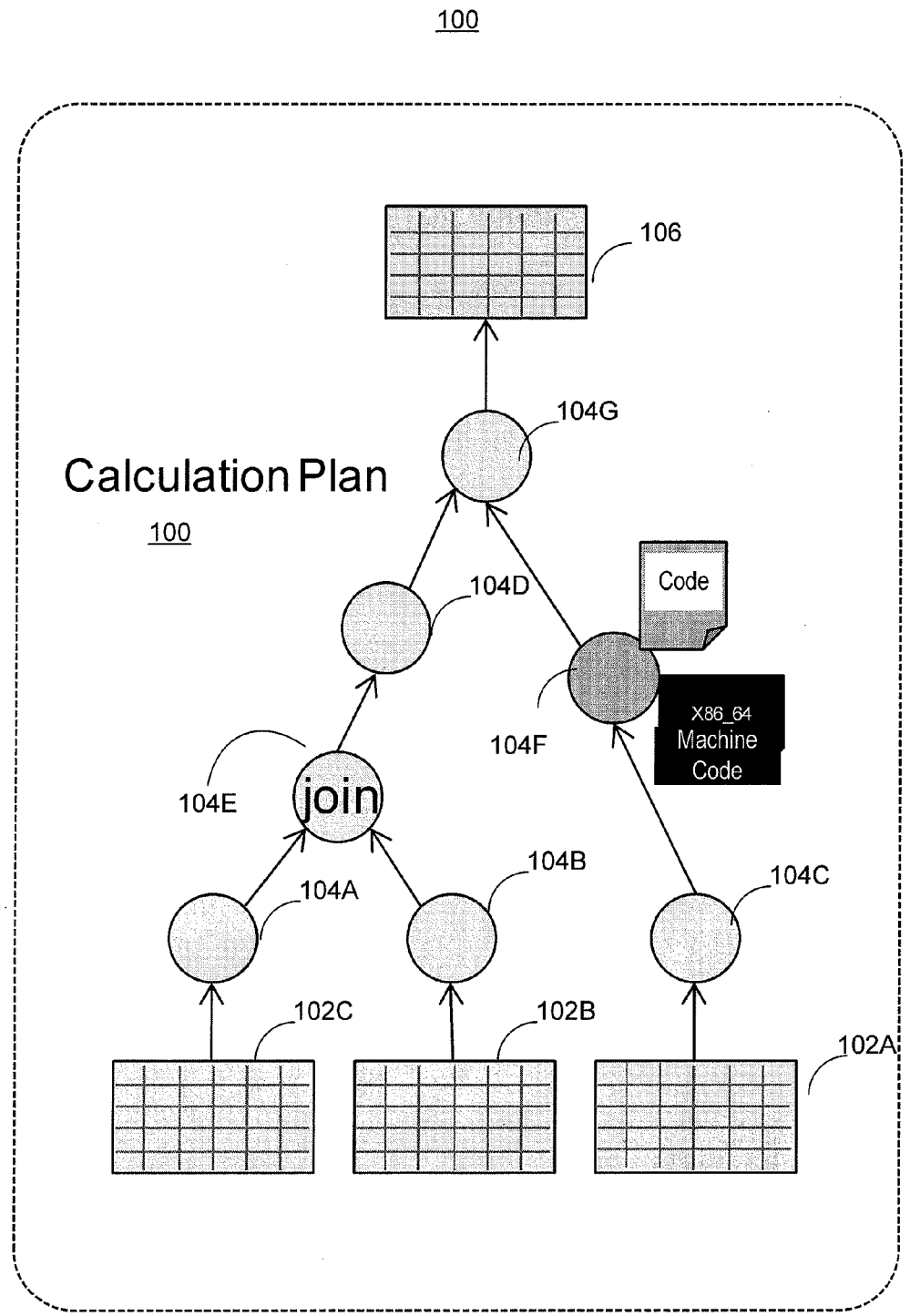
FIG. 1 depicts an example of a calculation plan.

Like labels are used to refer to same or similar items in the drawings.

DETAILED DESCRIPTION

The subject matter described herein relates to a function node configured to provide a complex function using code executed at the database layer. Moreover, the function node including the complex function may, in some implementations, be defined by a user of the database, although the function node including the complex function may be pre-configured and/or created on-the-fly as well.

For example, a calculation plan (also referred to as a "query plan" of the database engine 230 described further below) may be determined for querying a database and performing at least one complex function on data obtained from the database. Moreover, the calculation plan may include at least one node for query operations, such as a join, a merge, etc., and at least one function node (which is described further below and is also referred to herein as a generic node). The function node may include code, such as a script based on the SQL language or extensions to SQL (referred to herein as SQL script), C, C++, a subset of C++, and any other language configured to provide complex functions. Thus, rather than compile and/or execute the function node at the client side (see, e.g., client application 210 described further below), the function node is executed in the database along with other nodes of the calculation plan.

FIG. 1 depicts an example of a calculation plan 100. The calculation plan 100 refers to a model that depicts how query operations and/or complex functions are to be performed at a database. The calculation plan 100 may be represented graphically, as depicted at FIG. 1. In the example of FIG. 1, an acyclic graph models the calculation plan using arrows to represent data flows from the database tables 102A-C, and nodes 104A-G represent query operations and/or complex functions which may be performed. The calculation plan 100 includes a join operation at node 104E, as well as other operations at nodes 104A-D, F, and G to yield a result set 106. The join 104E joins the results from nodes 104A and 104B, which represent the data access operations on the tables 102C-B.

Moreover, node 104F represents a complex calculation or function. The node 104F (which is referred herein as a function node and/or a generic node) may include code, such as SQL script, C++, a subset of C++, the L Language (which is a subset of C++ providing safe and optimum database implementations), and/or any other code. A function node including code, such as SQL script, may, in some implementations, provide a function that controls complex logic (e.g., if/else, throw/catch, etc.), provide a function which returns multiple results rather than a single result set as is the case with an SQL query, enable the decomposition of complex functions into smaller functions, and/or enable support for local variables for intermediate results during the function calculation. Moreover, SQL script may be used as a high-level query language which is compiled into a calculation plan containing function nodes.

During generation of the calculation plan 100, a compiler, such as an SQL script compiler, etc., may generate code, which is placed into, or associated with, function node 104F. When the calculation plan 100 is being executed and compilation of the function node 104F (as well as other nodes) is required for execution of the calculation plan 100, a compiler compiles the code of function node 104F into another form, such as intermediate representation of a virtual machine (e.g. Java bytecode, ABAP bytecode, or LLVM instructions), machine code of the underlying CPU (e.g. x86_64 machine code), and/or other like mechanisms. Compilation to machine code may be done by a Just-in-time (JIT) compiler integrated into the database 290 and the like. When the calculation plan 100 is executed at the database management system, the nodes 104A-G are thus executed at the database layer, and the function node 104F calls, when executed, the compiled machine code or an interpreter which runs the code. In some implementations, function node 104F enables the execution of data intensive calculations inside function node 104F at the database rather than at a client application, reducing (if not eliminating) the need to transfer large amounts of data from the database to the client-side application.

Figure 2:
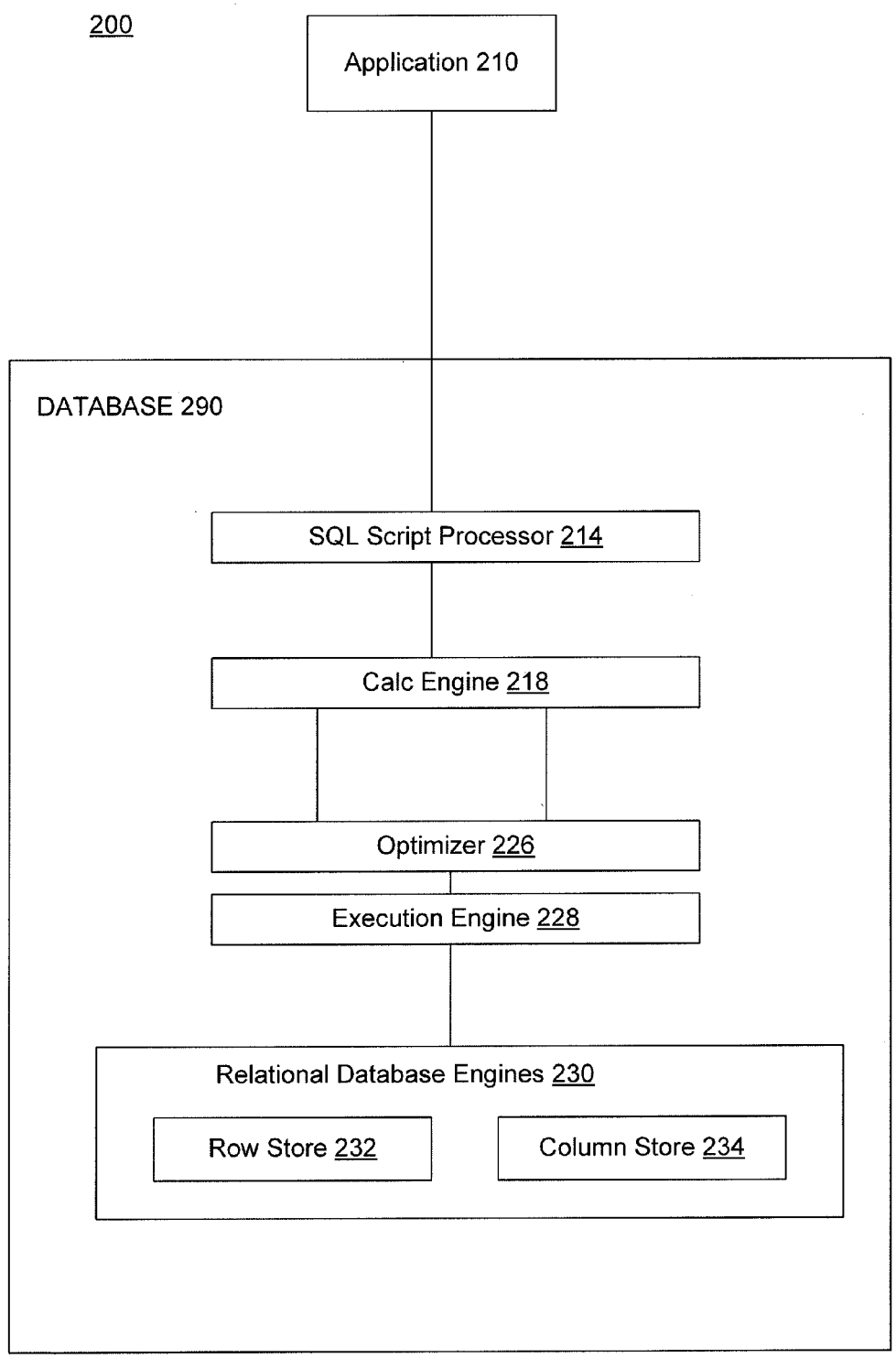
FIG. 2 depicts an example of a system configured to execute the calculation plan of FIG. 1.

FIG. 2 depicts a system 200 configured to execute a calculation plan, such as calculation plan 100 which includes at least one function node. The system 200 includes an application 210 configured to access the database 290. The database 290 further includes an SQL script processor 214, a calculation engine 218, an optimizer 226, an execution engine 228, and a relational database engine 230, which further includes row store 232 and column store 234. The subject matter described herein relates to including code implemented, for example, in C, C++, a subset of C++, and the like into a function node, such that the function node is compiled into lower level code for execution at the database engine 230 along with the other nodes of the calculation plan 100.

The application 210 may be implemented as an application accessing the database 290. For example, application 210 may be an application, a client application, and the like accessing database 290 (e.g., to implement operations at database 290, such as a query, etc.). The application 210 may also be configured to define complex functions using code, such as SQL script, C++, C, a subset of C++, and the like. When SQL script is used, a SQL script processor compiles the SQL script functions into calculation plans, which may contain one or more functions nodes.

The SQL script processor 214 is configured to receive a command from application 210, such as a query and/or an SQL command, parse the command (e.g., parse the SQL in the query), compile the function of the function node 104F (e.g., the code and/or SQL script for the function of the function node 104F), perform optimization (e.g., of the SQL script), and/or provide a calculation plan to the calculation engine 218. SQL script refers to a script including functions to provide calculations (or complex functions).

However, in some implementations, the function of the function node 104F may be implemented using a low-level language, such as a script based code/language (e.g., SQL script), C, C++, a subset of C++, L, and any other language configured to provide complex functions. When that is the case, the SQL script processor 214 pushes down the low-level language code of the function into function node 104F of the calculation plan 100. In any case, during execution of the calculation plan 100, the function node 104F is compiled into a virtual machine language and/or a machine language to enable execution by the execution engine 228.

To further illustrate by way of an SQL example, simple SQL provides an aggregation command, but aggregation cannot be used to compute the sum of amounts stored in different currencies. To execute such a currency operation in the database 230 layer, application-specific logic, such as SQL script, code, and the like, may be used to perform the currency conversion function in a function node.

The calculation engine 218 may be configured to receive and/or generate one or more calculation plans, and then determine a unified calculation plan regardless of the domain. The calculation engine 218 may provide a unified query plan to the optimizer 226. The optimizer 226 may be configured to receive a query plan and provide an optimized query plan to the execution engine 228, which performs the actual execution on the relational database engines 230 (e.g., on the row store 232 and/or column store 234).

The execution engine 228 is configured to control access to different database engines (e.g., row store and/or column store) and route any intermediate results to another execution step in the calculation plan 100.

The database 230 may be implemented as any type of database. However, in some implementations, the database 230 is implemented as an in-memory database. An in-memory database keeps most, if not all, of the relevant database data in main memory rather than disk-based storage. Examples of main memory include cache, dynamic random access memory (DRAM), static random access memory, and the like.

To illustrate by way of an example implementations of the function node, the script in the function node may be compiled into an intermediate representation which is further compiled into machine code. For example, when the code of function node 104F is compiled into intermediate code of a virtual machine (e.g. LLVM instructions), the intermediate code is stored for function node 104F and later executed by the execution engine 228 and the relational database engines 230. In addition, when called for the first time, the intermediate code of the function node is compiled into executable machine code or runtime objects that can be directly executed at the relational database engine 230. Moreover, the runtime objects may be cached and then reused for subsequent invocations. The remaining nodes of the calculation plan 100 are also transformed into a set of physical database execution plans, which include the previously compiled runtime objects for function nodes 104F.

Figure 3:
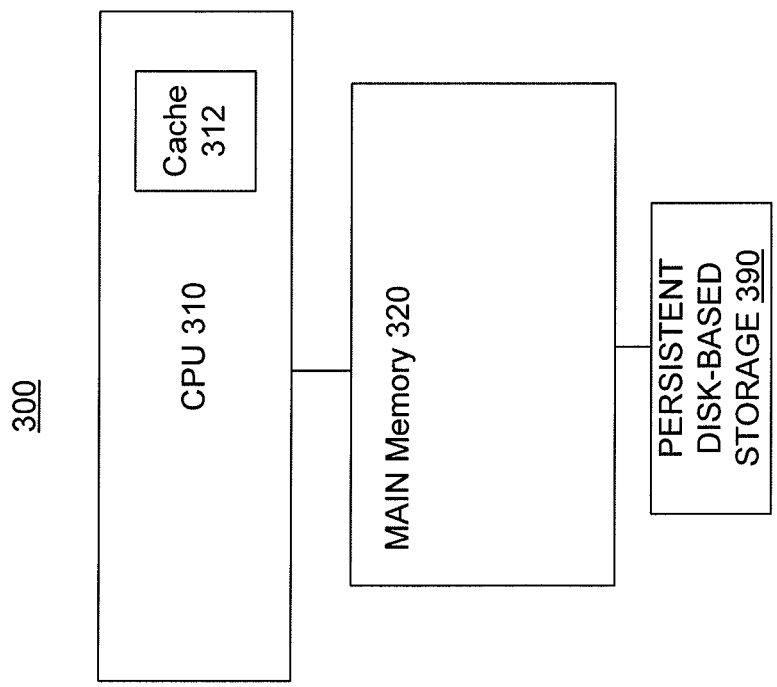
FIG. 3 depicts an example of a system including an in-memory database.

FIG. 3 depicts a system 300 including a central processing unit 310, cache 312, main memory 320, and disk-based storage 390. In the implementation of system 300, the database 290 (e.g., the database management system application) and the relevant data for the database are primarily maintained in memory 320. When that is the case, any queries and/or calculations are performed on the data in memory 320 rather than on data in persistent, disk-based storage 390. In some implementations, such use of main memory 320 reduces data access latency times by at least an order of about 300. Furthermore, the application 210 may also be hosted at system 300. Referring again to FIG. 1, the database 290 may be implemented as a column-oriented database 234, although a row-oriented database 232 may be used as well. A column-oriented database refers to a database management system configured to store relevant data based on columns, not rows. On the other hand, a row-oriented database refers to a database management system configured to store relevant data based on rows, not columns.

Figure 4:
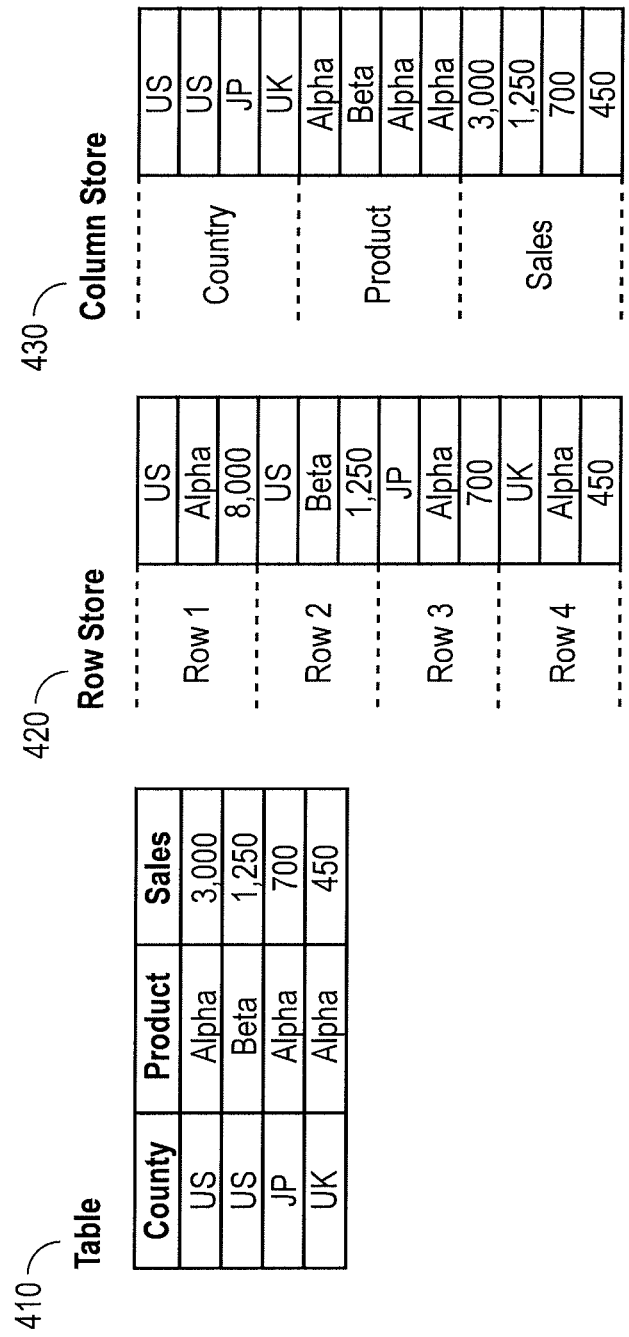
FIG. 4 depicts examples of column store and row store.

FIG. 4 depicts a table 410 including relevant data for country, product, and sales. In a row-oriented database, the relevant data is stored based on rows as depicted at row store 420; while in a column-oriented database, the relevant data is stored based on columns as depicted at column store 430.

Figure 5:
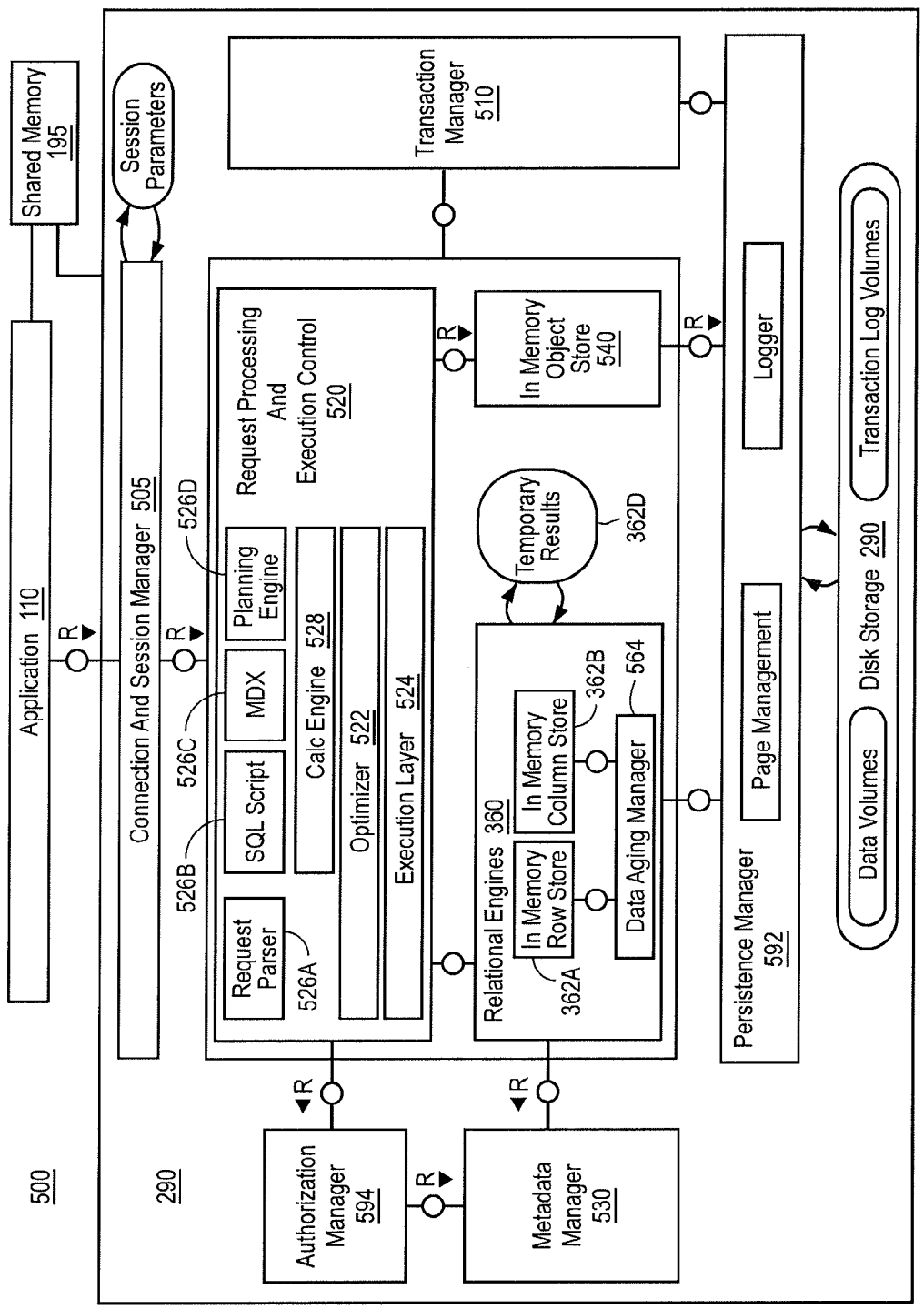
FIG. 5 depicts another example of a system configured to execute the calculation plan of FIG. 1.

FIG. 5 depicts a system 500 that is similar to system 100 in some ways but includes additional elements as depicted at FIG. 5 and described further below.

The application 110 couples to database 290 via a connection and session manager 505. The connection and session manager 505 creates and manages sessions and connections for database clients, such as application 110. For each session, the connection and session manager 505 maintains a set of parameters for the connection and/or session. Once a session is established, the application 110 may send commands, such as SQL statements, multidimensional expression (MDX) statements, and the like, to access database 290.

A command received at database 290 is processed in the context of a transaction. The transaction manager 510 coordinates database transactions, controls transactional isolation, keeps track of running transactions, and keeps track of closed transactions. When a transaction is committed or rolled back, the transaction manager 510 informs those components of system 500 involved in the transaction so that the components can execute any necessary actions.

The commands received from application 110 are analyzed and executed by a request processing and execution control (RPEC) component 520. The RPEC 520 includes a request parser for analyzing the command received from application 110 (e.g., an SQL statement and/or an MDX statement received from application 110) and dispatches the command (or corresponding requests) to another element within database 290. For example, transaction control statements are forwarded to the transaction manager 510, data definition statements are dispatched to the metadata manager 530, and object invocations are forwarded to object store 540. Data manipulation statements may be forwarded to the optimizer 522 for creating an optimized execution plan, which is then given to the execution layer element 524. The execution layer element 524 acts as a controller that invokes the different engines 362A and 362B and routes any intermediate results to another portion of the execution process.

The database 290 may also include domain-specific portions, such as a financial planning engine 526D. In addition, the database 290 may include scripting, such as for example, SQL scripting 526B that enables running application-specific calculations inside database 290. The SQL script 526B may be configured for optimizations and parallelization of SQL statements. RPEC 520 may also be configured to support multidimensional queries via MDX component 526C.

The planning engine 526C may provide financial planning applications to execute basic planning operations in the database 290. For example, planning engine 526C may allow creation of a new version of a data set as a copy of an existing data set while applying filters and transformations. In this example, planning data for a new year is created as a copy of the data from the previous year by filtering by year and updating the time dimension.

The SQL script 526B, MDX 526C, and planning engine 526D may be implemented using a calculation engine 528, which provides a common infrastructure for SQL script 526B, MDX 526C, and planning engine 526D.

Metadata may be accessed via the metadata manager 530. The metadata may include a variety of objects. Examples of metadata include the definition of relational tables, the definition of columns, the definition of views at application 110, the definition of indexes, the definition of SQL script functions, and object metadata. Metadata of all these types may be stored in one common catalog accessible by components of system 500 regardless of whether the store is in-memory row store, in-memory column store, object store, disk based, etc. The database 290 may also support multi-version concurrency control and multiple tenants, some of which may share common data and some of which may have separate tenant-specific data.

The database 290 may include one or more relational database engines 360 operative with in-memory row store 362A and/or in-memory column store 362B, although disk based databases may be used as well. The in-memory row store 362A is a relational in-memory database engine that stores data in a row based way. The in-memory column store 362B is a relational in-memory database engine that stores data in a column-based way. Although most, if not all, of the relevant data handled by database 290 is stored in-memory, some data may be stored on a disk-based storage device (e.g., data that has aged and is no longer in use or tracing data). Data in disk-based storage, such as disk storage 290, is primarily stored on disk.

When a database table is created, database 290 specifies where it is stored, e.g., whether the table is stored in row, column, disk, or any combination of row, column, and disk. In some implementations using SQL, certain SQL extensions are only available for specific stores. Moreover, database 290 may allow tables from different stores to be combined using one statement (e.g., a join, a subquery, a union, etc.).

As row-based tables and column-based tables may be combined in one SQL statement or one calculation plan, the corresponding engines 362A-B consume intermediate results cached in 362D. A difference between the row-based and column-based database engines 362A-B is the way the engines process data. For example, row store operators may process data one row-at-a-time using iterators, and column store operations may require that an entire column of data be available in contiguous memory locations. To exchange intermediate results at 362D, row store 362A may provide results to column store 362B materialized as complete rows in memory, while column store may expose results using the iterator interface needed by row store 362A.

The object store 540 is an in-memory store for graph-like structures represented by networks of objects. The object store 540 may be used to optimize and plan tasks that operate on large volumes of graph-like data, such as supply chain management data.

The data aging manager 564 is used to manage the movement of data from in-memory mechanisms to persistent, disk based storage 290. For example, the data aging manager 564 may regard data as aged if it is no longer needed during normal business operations, if the data is rarely accessed, or a significant amount of time has passed since last being accessed. When that is the case, the data aging manager 564 may move the data from memory to disk storage 290.

The persistence manager 592 manages the durability and atomicity of transactions. For example, the persistence manager 592 ensures that the database 290 is restored to the most recent committed state after a restart and that transactions are either completely executed or completely undone. The persistence manager 592 also provides interfaces for writing/reading data, and contains a logger for managing a transaction log.

The database 290 may also include an authorization manager 594, which is invoked by other components of system 500 to check whether a user has the required privileges to execute a requested operation. A privilege grants a right to perform a specified operation (such as create, update, select, execute, and so on) on a specified object (for example a table, a view, an SQLScript function, and so on). Users may also be authenticated via for example a login with user identification and password.

Figure 6:
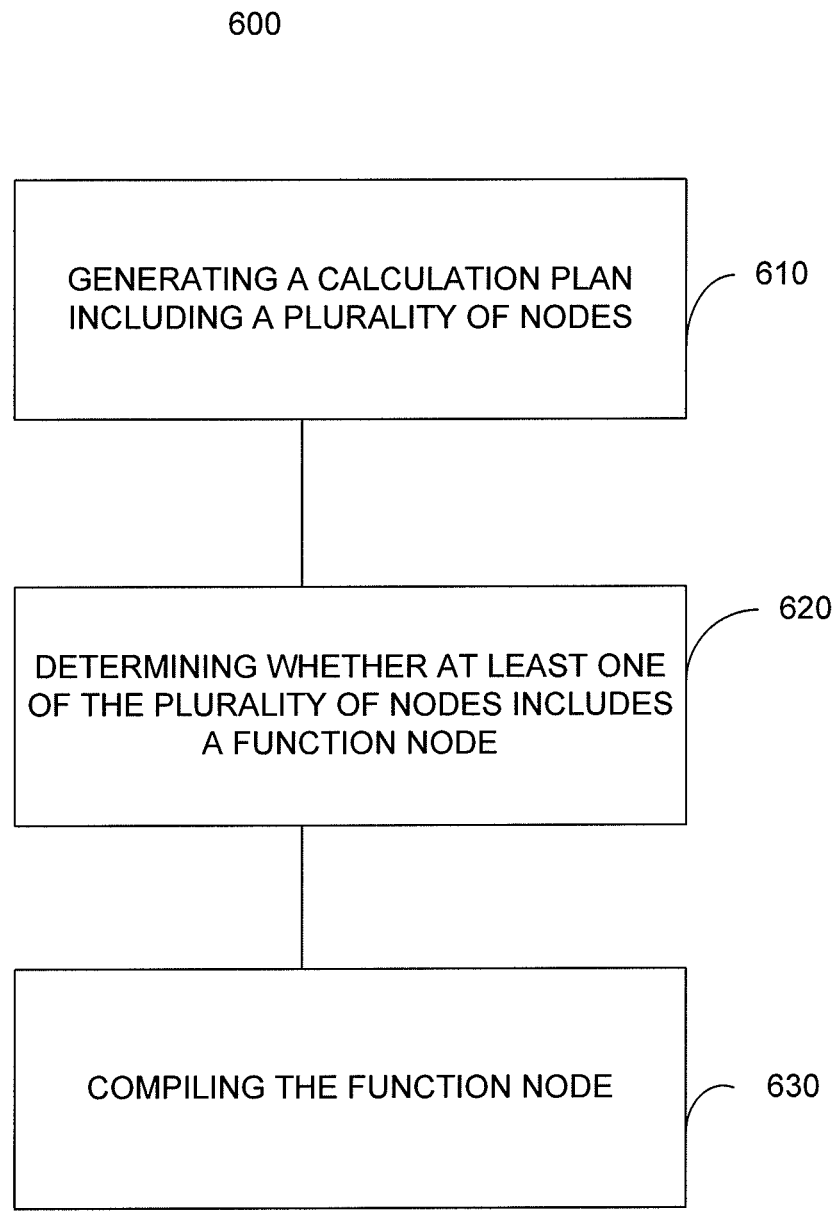
FIG. 6 depicts a process for generating a calculation plan including a function node.

FIG. 6 depicts a process 600 for generating a calculation plan including a function node. The process 600 may be implemented at any computer-based system, such as for example systems 100 and/or 500.

At 610, a calculation plan including a plurality of nodes may be generated. For example, a database 290 or an element within database 290 (e.g., calculation engine 218) may generate a calculation plan, such as calculation plan 100. The calculation plan may include a plurality of nodes, such as nodes 104A-G representing query operations and/or complex functions, which may be performed at database 290.

At 620, a determination is made of whether at least one of the plurality of nodes includes a function node. For example, the script processor 214 may determine that a node is a function node including a complex function and then insert a script to calculate the complex function into the node.

At 630, when a function node is present, the function node is compiled into lower-level code. During generation of the calculation plan 100, a compiler, such as an SQL script compiler at script processor 214, may generate code, which is placed into, or associated with, function node 104F. When the calculation plan 100 is being executed and compilation of the function node 104F (as well as other nodes) is required for execution of the calculation plan 100, a compiler may further compile the code of function node 104F into another form, such as JAVA, ABAP, LLVM instructions etc. In some implementations, a JIT compiler may further compile an intermediate code into a machine code, such as x86_64 machine code. The nodes 104A-G are thus executed at the database layer of the relational database engines 230. The result set obtained from applying the calculation plan on the relational database engines 230 is provided to the application 210.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

Although a few variations have been described in detail above, other modifications are possible. For example, while the descriptions of specific implementations of the current subject matter discuss analytic applications, the current subject matter is applicable to other types of software and data services access as well. Moreover, although the above description refers to specific products, other products may be used as well. In addition, the logic flows depicted in the accompanying figures and described herein do not require the particular order shown, or sequential order, to achieve desirable results. Other embodiments may be within the scope of the following claims.

What is claimed:

1. A non-transitory computer-readable medium containing instructions to configure a processor to perform a method, the method comprising:
   generating a calculation plan including a plurality of nodes;
   determining whether at least one of the nodes includes a function node, the function node including at least one complex function for performing at least one calculation to access data stored in a table in a database based on a metadata contained in a common metadata catalog, the metadata determining whether a row store of the database is to be accessed or a column store of the database is to be accessed during execution of the at least one complex function; and
   compiling the function node into an intermediate code representative of a virtual machine language, wherein the intermediate code is compiled into an executable code or a runtime object to enable execution of the plurality of nodes including the function node at the database and executed at the database, the function node performs the at least one complex function of the calculation plan inside the function node at the database without transferring data from the database to a client application querying the database, wherein the runtime object is cached for a subsequent reuse;
   wherein a row store database engine is used to access the data stored in the row store and a column store database engine is used to access the data stored in the column store.

2. The non-transitory computer-readable medium of claim 1, wherein the calculation plan defines a process for accessing a relational database system including the row store and the column store.

3. The non-transitory computer-readable medium of claim 1, wherein the function node implements a function using at least one of a code and a script.

4. The non-transitory computer-readable medium of claim 1, wherein the execution of the plurality of nodes including the function node occurs at the database rather than at the client application querying the database.

5. The non-transitory computer-readable medium of claim 1, wherein compiling further comprises:
   compiling at least one of a script and a code of the function node into another code executable at the database during execution of the calculation plan.

6. The non-transitory computer-readable medium of claim 5, wherein compiling further comprises:
compiling the at least one of the script and the code into at least one of a bytecode and a machine code.

7. A computer-implemented method comprising:
generating a calculation plan including a plurality of nodes;
determining whether at least one of the nodes includes a function node, the function node including at least one complex function for performing at least one calculation to access data stored in a table in a database based on a metadata contained in a common metadata catalog, the metadata determining whether a row store of the database is to be accessed or a column store of the database is to be accessed during execution of the at least one complex function; and
compiling the function node into an intermediate code representative of a virtual machine language, wherein the intermediate code is compiled into an executable code or a runtime object to enable execution of the plurality of nodes including the function node at the database and executed at the database, the function node performs the at least one complex function of the calculation plan inside the function node at the database without transferring data from the database to a client application querying the database, wherein the runtime object is cached for a subsequent reuse;
wherein a row store database engine is used to access the data stored in the row store and a column store database engine is used to access the data stored in the column store.

8. The computer-implemented method of claim 7, wherein the calculation plan defines a process for accessing a relational database system including the row store and the column store.

9. The computer-implemented method of claim 7, wherein the function node implements a function using at least one of a code and a script.

10. The computer-implemented method of claim 7, wherein the execution of the plurality of nodes including the function node occurs at the database rather than at the client application querying the database.

11. The computer-implemented method of claim 7, wherein compiling further comprises:
compiling at least one of a script and a code of the function node into another code executable at the database during execution of the calculation plan.

12. The computer-implemented method of claim 11, wherein compiling further comprises:
compiling the at least one of the script and the code into at least one of a bytecode and a machine code.

13. A system comprising:
at least one processor; and
at least one memory, wherein the at least one processor and the at least one memory provide operations comprising:
generating a calculation plan including a plurality of nodes;
determining whether at least one of the nodes includes a function node, the function node including at least one complex function for performing at least one calculation to access data stored in a table in a database based on a metadata contained in a common metadata catalog, the metadata determining whether a row store of the database is to be accessed or a column store of the database is to be accessed during execution of the at least one complex function; and
compiling the function node into an intermediate code representative of a virtual machine language, wherein the intermediate code is compiled into an executable code or a runtime object to enable execution of the plurality of nodes including the function node at the database and executed at the database, the function node performs the at least one complex function of the calculation plan inside the function node at the database without transferring data from the database to a client application querying the database, wherein the runtime object is cached for a subsequent reuse;
wherein a row store database engine is used to access the data stored in the row store and a column store database engine is used to access the data stored in the column store.

14. The system of claim 13, wherein the calculation plan defines a process for accessing a relational database system including the row store and the column store.

15. The system of claim 13, wherein the function node implements a function using at least one of a code and a script.

16. The system of claim 13, wherein the execution of the plurality of nodes including the function node occurs at the database rather than at the client application querying the database.

17. The system of claim 13, wherein compiling further comprises:
compiling at least one of a script and a code of the function node into another code executable at the database during execution of the calculation plan.

18. The system of claim 17, wherein compiling further comprises:
compiling the at least one of the script and the code into at least one of a bytecode and a machine code.

* * * * *